(12) United States Patent　　(10) Patent No.: US 9,162,298 B2
Chiang et al.　　(45) Date of Patent: Oct. 20, 2015

(54) LASER ALIGNMENT DEVICE FOR CIRCULAR SAW

(71) Applicant: REXON INDUSTRIAL CORP., LTD., Taichung (TW)

(72) Inventors: Wen Chin Chiang, Taichung (TW); Hung Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 135 days.

(21) Appl. No.: 14/139,001

(22) Filed: Dec. 23, 2013

(65) Prior Publication Data

US 2014/0250704 A1　　Sep. 11, 2014

(30) Foreign Application Priority Data

Mar. 7, 2013　(TW) .............................. 102108110 A

(51) Int. Cl.
*G01B 11/27*　　(2006.01)
*B23D 59/00*　　(2006.01)

(52) U.S. Cl.
CPC ..................................... *B23D 59/003* (2013.01)

(58) Field of Classification Search
CPC ........................................................ B23D 59/003
USPC ........................................... 33/628, 639, 640
See application file for complete search history.

(56) References Cited

U.S. PATENT DOCUMENTS

| | | | |
|---|---|---|---|
| 4,468,993 A | 9/1984 | McCown et al. | |
| 4,885,967 A | 12/1989 | Bell et al. | |
| 5,285,708 A | 2/1994 | Bosten et al. | |
| 5,375,495 A | 12/1994 | Bosten et al. | |
| 5,461,790 A | 10/1995 | Olstowski | |
| 5,546,840 A | 8/1996 | Supe-Dienes | |
| 5,675,899 A | 10/1997 | Webb | |
| 5,862,727 A | 1/1999 | Kelly | |
| 5,949,810 A | 9/1999 | Star et al. | |
| 6,035,757 A | 3/2000 | Caluori et al. | |
| 6,497,168 B1 | 12/2002 | Levine | |
| 6,552,354 B2 | 4/2003 | Heine | |
| 6,584,695 B1 | 7/2003 | Chang | |
| 6,688,203 B2 | 2/2004 | Chen | |
| 6,742,430 B2 | 6/2004 | Chen | |
| 6,755,107 B2 | 6/2004 | Peot et al. | |

(Continued)

FOREIGN PATENT DOCUMENTS

DE　2402311 A1　7/1975
DE　3922849 A1　1/1991

(Continued)

*Primary Examiner* — G. Bradley Bennett
(74) *Attorney, Agent, or Firm* — Bacon & Thomas, PLLC

(57) ABSTRACT

A laser alignment device for a circular saw includes a base located on a blade guard of the circular saw, and a laser module mounted at the base. The laser module includes a retaining seat pivotally connected to the base, an auxiliary seat mounted at the retaining seat, and a laser beam generator installed in the auxiliary seat. A first adjusting unit includes a first knob and a first eccentric shaft connected to the first knob and coupled to a first elongated slot in the retaining seat for allowing adjustment of the angle of inclination of the laser beam generator by rotating the first knob. A second adjusting unit includes a second knob and a second eccentric shaft connected to the second knob and coupled to a second elongated slot in the auxiliary seat for allowing adjustment of the angular position of the laser beam generator by rotating the second knob.

9 Claims, 11 Drawing Sheets

(56) References Cited

U.S. PATENT DOCUMENTS

| | | |
|---|---|---|
| 6,890,135 B2 | 5/2005 | Kopras et al. |
| 6,915,727 B2 | 7/2005 | Caluori |
| 6,918,331 B2 | 7/2005 | Okouchi |
| 6,988,439 B2 | 1/2006 | Liu et al. |
| 7,096,587 B2 | 8/2006 | Onose et al. |
| 7,159,497 B2 | 1/2007 | Weusthof et al. |
| 7,207,251 B2 | 4/2007 | Ushiwata et al. |
| 7,226,179 B2 | 6/2007 | Garcia et al. |
| 7,267,039 B2 | 9/2007 | Liao et al. |
| 7,284,335 B2 | 10/2007 | Park et al. |
| 7,347,133 B2 | 3/2008 | Cheng et al. |
| 7,367,254 B2 | 5/2008 | Ushiwata et al. |
| 7,373,866 B2 | 5/2008 | Ushiwata et al. |
| 7,383,759 B2 | 6/2008 | Ushiwata et al. |
| 7,387,058 B2 | 6/2008 | Ushiwata et al. |
| 7,398,719 B2 | 7/2008 | Peot et al. |
| 7,418,894 B2 | 9/2008 | Ushiwata et al. |
| 7,458,696 B2 | 12/2008 | Chen |
| 7,556,401 B2 | 7/2009 | Smith et al. |
| 7,696,450 B2 | 4/2010 | Ushiwata et al. |
| 7,793,575 B2 | 9/2010 | Ushiwata et al. |
| 7,886,644 B2 | 2/2011 | Ushiwata et al. |
| 7,926,398 B2 | 4/2011 | Garcia et al. |
| 7,930,962 B2 | 4/2011 | Ushiwata et al. |
| 8,276,281 B2 | 10/2012 | Zhang |
| 8,359,960 B2 | 1/2013 | Ushiwata et al. |
| 2001/0049988 A1* | 12/2001 | Ushiwata et al. ............... 83/520 |
| 2003/0010173 A1 | 1/2003 | Hayden |
| 2003/0233921 A1 | 12/2003 | Garcia et al. |
| 2004/0083869 A1* | 5/2004 | Aziz et al. ....................... 83/520 |
| 2004/0261592 A1 | 12/2004 | Chen |
| 2005/0094386 A1* | 5/2005 | Zhang et al. ................... 362/119 |
| 2005/0180486 A1 | 8/2005 | Tung |
| 2005/0188808 A1 | 9/2005 | Parrish et al. |
| 2005/0270531 A1* | 12/2005 | Garcia et al. ................... 356/399 |
| 2005/0286261 A1 | 12/2005 | Lin |
| 2006/0042444 A1 | 3/2006 | Ushiwata et al. |
| 2006/0080850 A1 | 4/2006 | Firth |
| 2006/0101969 A1 | 5/2006 | Garcia et al. |
| 2006/0179666 A1 | 8/2006 | Mok et al. |
| 2006/0230894 A1 | 10/2006 | Meredith et al. |
| 2008/0245207 A1 | 10/2008 | Wu |
| 2009/0077817 A1* | 3/2009 | Gibbons et al. ................. 30/392 |
| 2010/0269655 A1* | 10/2010 | Pierga et al. .................... 83/165 |
| 2011/0113943 A1 | 5/2011 | Tung |
| 2011/0259167 A1 | 10/2011 | Tung |
| 2011/0265625 A1 | 11/2011 | Lawlor et al. |
| 2011/0303060 A1 | 12/2011 | Shima et al. |
| 2012/0204688 A1* | 8/2012 | Rowe ................................ 83/13 |
| 2012/0255414 A1 | 10/2012 | Koegel |
| 2013/0019730 A1 | 1/2013 | Pierga et al. |

FOREIGN PATENT DOCUMENTS

| | | |
|---|---|---|
| DE | 29603450 U1 | 7/1996 |
| DE | 29616604 U1 | 11/1996 |
| JP | 2000317901 A | 11/2000 |
| TW | 209426 | 7/1993 |
| TW | 445945 U | 7/2001 |

* cited by examiner

LASER ALIGNMENT DEVICE FOR CIRCULAR SAW

FIELD OF THE INVENTION

The present invention relates to circular saw technology, and more particularly, to a laser alignment device for use in a circular saw.

BACKGROUND

Many circular saws are equipped with a laser beam generator in order to facilitate cutting of a workpiece by an operator. An alignment line on the surface of the workpiece is formed by means of the diffused light plane of the generated laser beam from the laser beam generator so that the saw blade can be moved into alignment with the alignment line for accurately cutting the workpiece. However, the operator needs to adjust the orientation of the laser beam generator to ensure good cutting accuracy before cutting the workpiece.

During adjustment of the orientation of the laser beam generator, a tool must be used to rotate adjustment screws at different locations, thus enabling the laser beam generator to be pushed by the adjustment screws to the desired position. This adjustment procedure requires the use of a tool and thus has the drawback of slow adjustment speed. Further, after adjustment of the position of the laser beam generator, the laser beam generator may be biased or deviated from the adjust position by the elastic restoring force of the mating springs, which lowers adjustment accuracy and affects cutting precision.

SUMMARY OF THE INVENTION

The present invention has been accomplished under the circumstances in view. It is therefore the main object of the present invention to provide a laser alignment device for a circular saw, which facilitates quick adjustment without the use of any tool.

To achieve this and other objects of the present invention, a laser alignment device of the invention comprises a base, a laser module, a first adjustment unit, and a second adjustment unit. The base is affixed to a blade guard of a circular saw. The laser module comprises a retaining seat, an auxiliary seat and a laser beam generator. The retaining seat is pivotally mounted at the base, and the retaining seat has a first elongated slot defined therein. The auxiliary seat has a second elongated slot defined therein and is pivotally mounted at the retaining seat. The laser beam generator is mounted at the auxiliary seat. The first adjustment unit comprises a first knob and a first eccentric shaft. The first knob is rotatably mounted at the base. The first eccentric shaft has one end thereof eccentrically and fixedly connected to the first knob, and an opposite end thereof coupled to the first elongated slot of the retaining seat. The second adjustment unit comprises a second knob and a second eccentric shaft. The second knob is rotatably mounted at the retaining seat. The second eccentric shaft has one end thereof eccentrically and fixedly connected to the second knob, and an opposite end thereof coupled to the second elongated slot of the auxiliary seat.

Thus, when rotating the first knob, the retaining seat is forced by the first eccentric shaft to bias relative to the base, thereby causing the laser beam generator to be biased with the retaining seat to quickly adjust a vertical angle of a light plane generated by the laser beam generator. When rotating the second knob, the auxiliary seat is forced by the second eccentric shaft to rotate relative to the retaining seat, thereby allowing quick adjustment of a horizontal angle of the light plane generated by the laser beam generator.

BRIEF DESCRIPTION OF THE DRAWINGS

Other advantages and features of the present invention will be understood by reference to the following specification in conjunction with the accompanying drawings, in which like reference characters denote like elements of structure.

Figure 1:
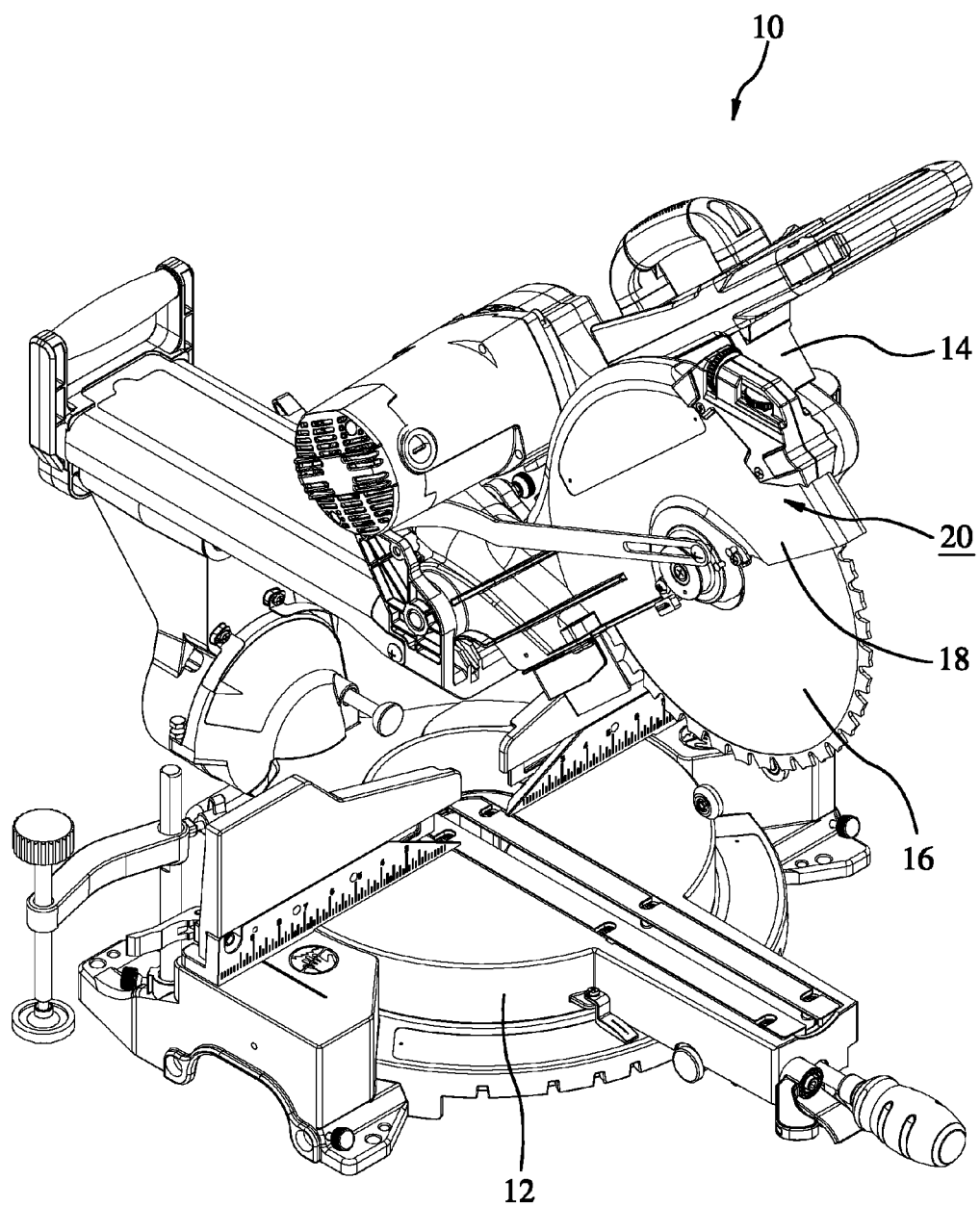
FIG. 1 is a top perspective view of a circular saw in accordance with the present invention.

It should be noted that the drawing figures are not necessarily drawn to scale, but are instead drawn to provide a better understanding of the components thereof, and are not intended to be limiting in scope, but rather to provide exemplary illustrations. It should further be noted that the figures illustrate an exemplary embodiment of a laser alignment device and the components thereof, and in no way limit the structures, configurations and components thereof according to the present disclosure.

DETAILED DESCRIPTION OF THE INVENTION

Referring to FIG. 1, a circular saw 10 in accordance with the present invention is shown. As illustrated, the circular saw 10 comprises a worktable 12, a saw arm 14 pivotally connected to the worktable 12, a saw blade 16 rotatably mounted at the saw arm 14, and a blade guard 18 partially surrounding the saw blade 16. The design of the circular saw 10 is well known in the art, and thus no further detailed description about the structure and operation of the circular saw will be necessary.

Figure 2:
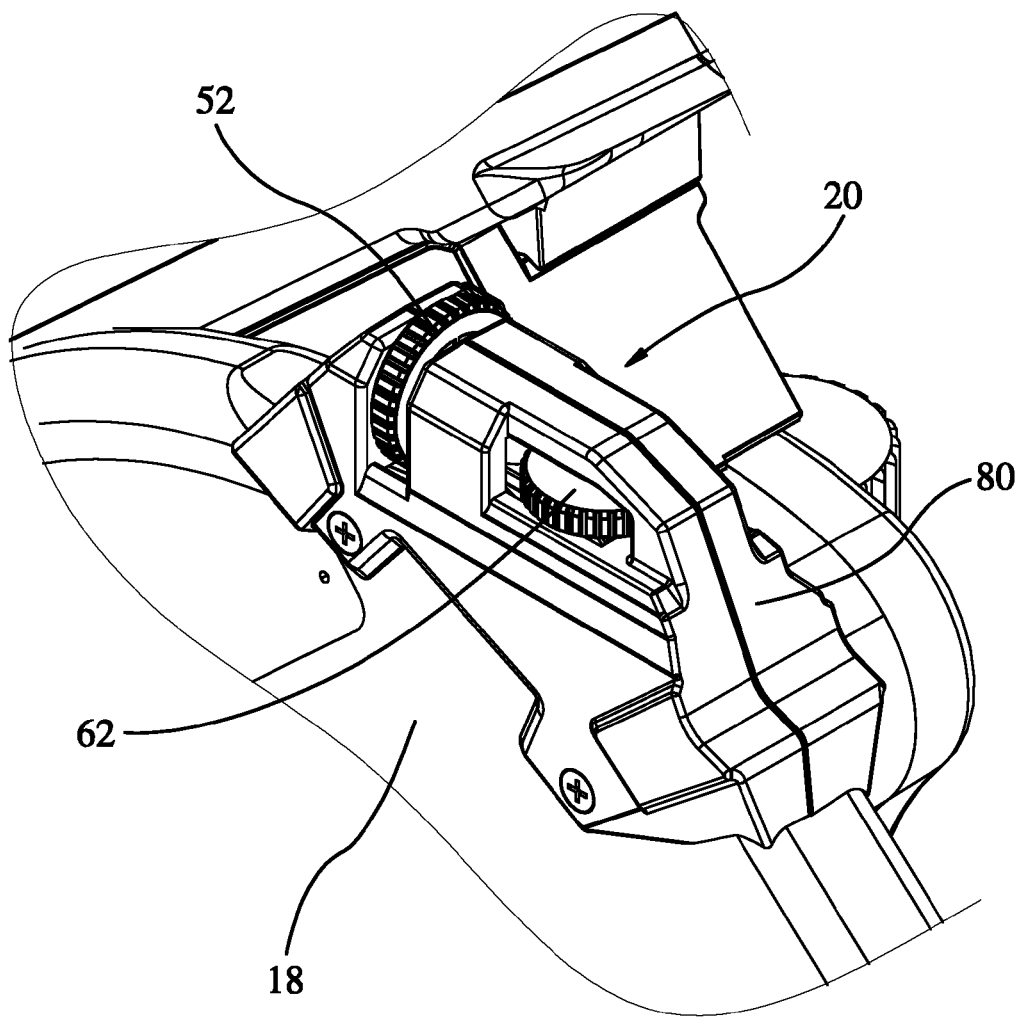
FIG. 2 is a top perspective view of a laser alignment device in accordance with the present invention.
Figure 3:
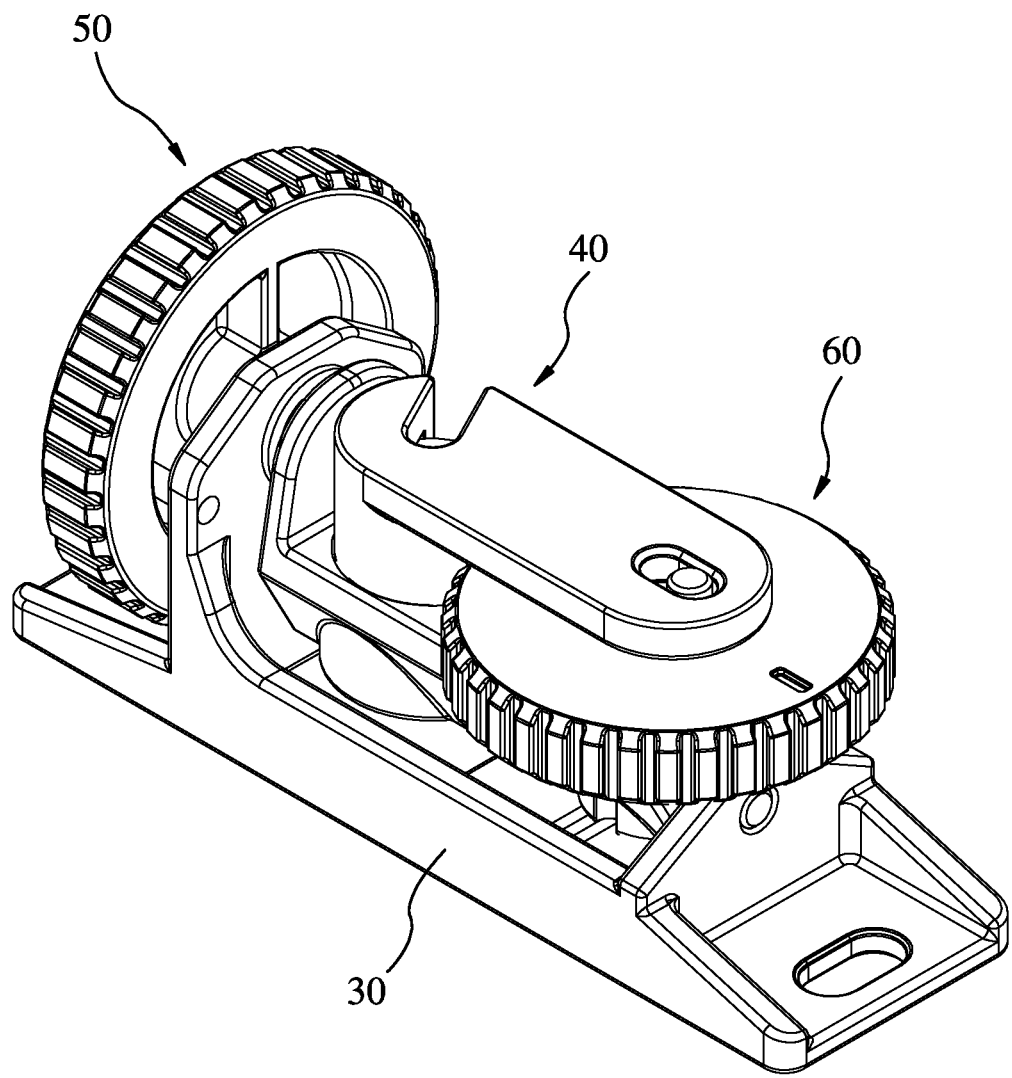
FIG. 3 is another top perspective view of the laser alignment device in accordance with the present invention after removal of the shell.

Referring to FIG. 2 and FIG. 3, a laser alignment device 20 for use in the aforesaid circular saw 10 in accordance with the present invention is shown. The laser alignment device 20 comprises a base 30, a laser module 40, a first adjustment unit 50, and a second adjustment unit 60.

Figure 4:
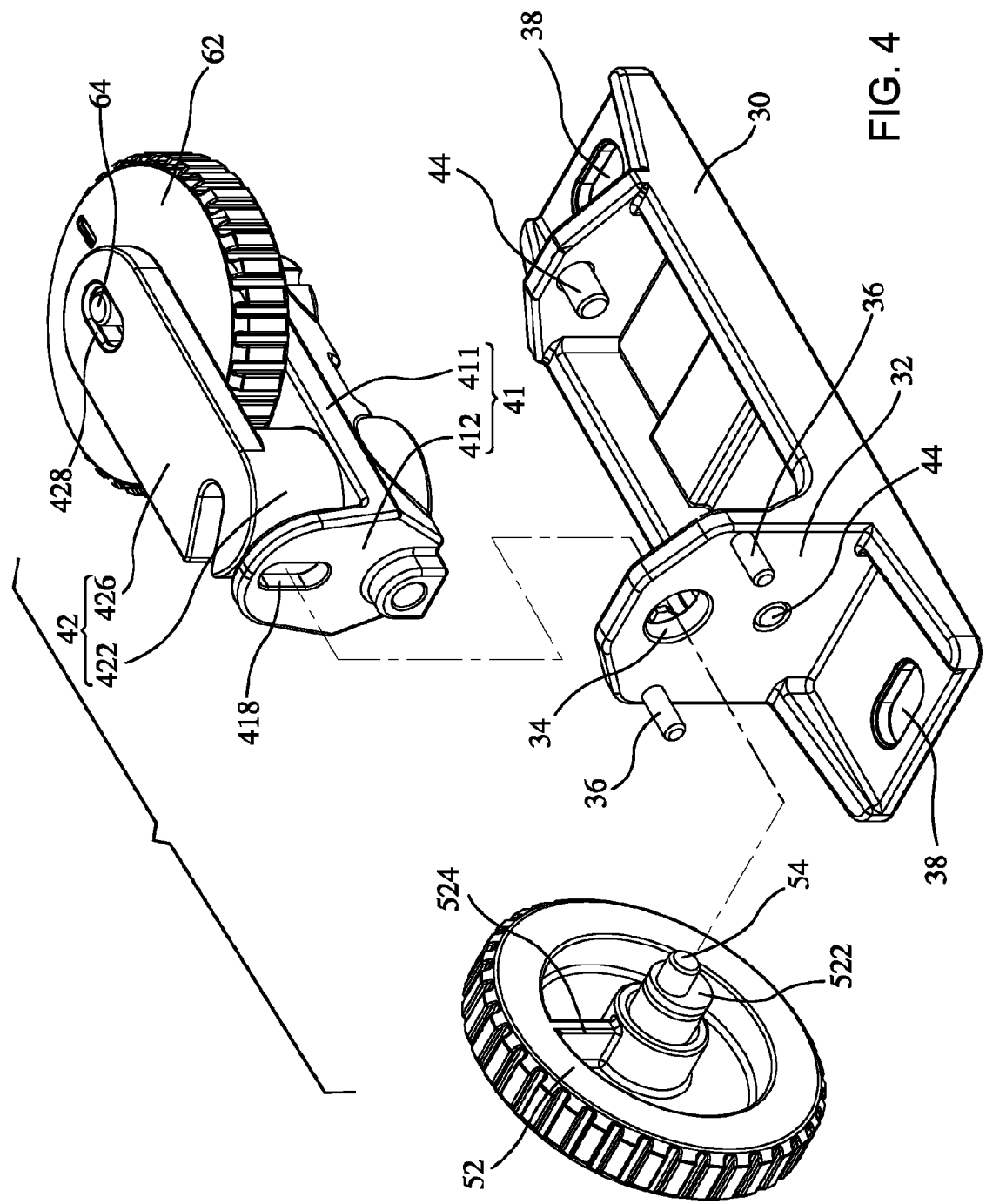
FIG. 4 is an exploded perspective view of the laser alignment device in accordance with the present invention.

The base 30, as shown in FIG. 4, comprises an upright wall 32 having a first axle hole 34 defined therein. Two first position-limit components 36 are oppositely located at the upright wall 32. Further, two mounting slots 38 are respectively defined in two distal ends of the base 30 for receiving a respective fastening member (not shown) to affix the base 30 to the blade guard 18. Subject to actual need, a shell 80, as shown in FIG. 2, may be affixed to the blade guard 18 so that it surrounds the base 30 to provide protection for the base 30.

Figure 5:
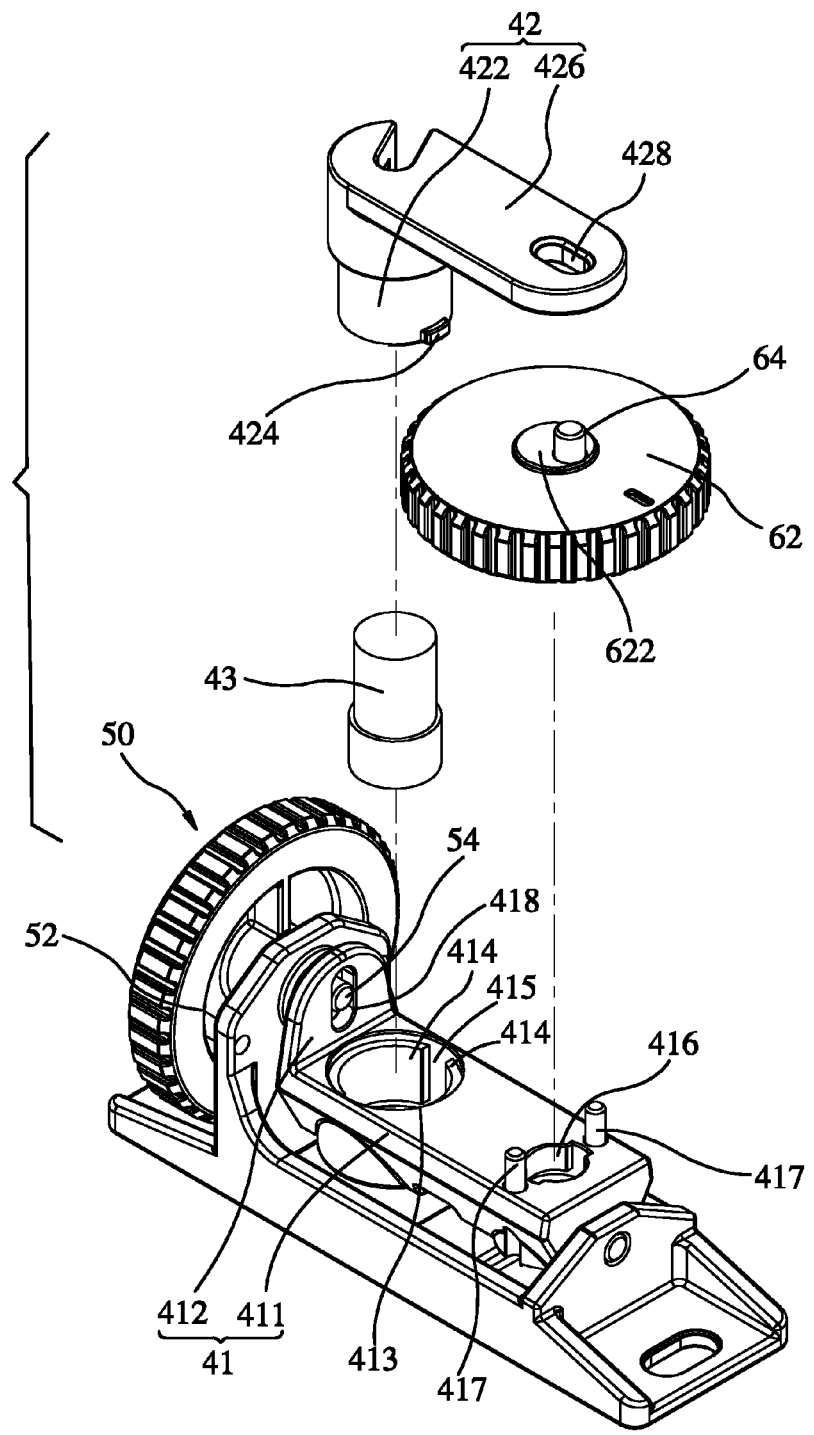
FIG. 5 is another exploded view of the laser alignment device in accordance with the present invention.

The laser module comprises a retaining seat 41, an auxiliary seat 42, and a laser beam generator 43, as shown in FIG. 4 and FIG. 5. The retaining seat 41 has two distal ends respectively and pivotally connected to the base 30 by a respective pivot pin 44. Further, the retaining seat 41 comprises a bottom wall 411, as well as an end wall 412 vertically and upwardly extending from one end of the bottom wall 411. The bottom wall 411 has a mounting hole 413 defined therein and corresponding to the laser beam generator 42 for accommodating the laser beam generator 42. The mounting hole 413 is located adjacent to the end wall 412. Two opposing first protruding blocks 414 are protrudingly formed in an inner periphery of the mounting hole 413, however, it should be appreciated that one single protruding block may be sufficient. Two opposing gaps 415 are longitudinally defined in the inner periphery of the mounting hole 413 and each gap 415 is located between the two opposing first protruding blocks 414, however, it should be appreciated that one single groove may be sufficient. Further, a second axle hole 416 is defined in a distal end of the bottom wall 411. Two opposing second position-limit components 417 are disposed on the bottom wall 411 and located adjacent to the second axle hole 416. A first elongated slot 418 is formed in the end wall 412 and corresponds to the first axle hole 34 such that the first elongated slot 418 communicates with the first axle hole 34.

The auxiliary seat 42 comprises a barrel 422. Two opposing second protruding blocks 424 are respectively disposed at an outer periphery of the barrel 422 and are located adjacent to a bottom end of the barrel 422 such that the two second protruding blocks 424 are spaced apart from each other. When mounting the auxiliary seat 42 to the mounting hole 413 of the retaining seat 41, the barrel 42 is inserted into the mounting hole 413 with the two second protruding blocks 424 correspondingly guided through the gaps 415 of the mounting hole 413, such that the barrel 42 is inserted and accommodated in the mounting hole 413. The auxiliary seat 42 is then rotated relative to the mounting hole 413 of the retaining seat 41, such that the second protruding blocks 424 are brought into engagement with the first protruding blocks 414 for refraining the barrel 422 from axial movement, so that the barrel 422 is still rotatable relative to the mounting hole 413.

The auxiliary seat 42 further comprises an extension arm 426 radially and outwardly extended from a top end of the barrel 422. A second elongated slot 428 is located at a distal end of the extension arm 426 and corresponds to the second axle hole 416. The laser beam generator 43 is fixedly mounted in the barrel 422 of the auxiliary seat 42 such that the laser beam generator 43 is synchronously rotatable with the auxiliary seat 42. When electrically conducted, the laser beam generator 43 emits a laser beam to form a light plane.

The first adjustment unit 50 comprises a first knob 52 and a first eccentric shaft 54, as shown in FIGS. 1, 3 and 4. The first knob 52 is exposed to the outside of the shell 80. The first knob 52 comprises a first shank 522 which passes through the first axle hole 34 for enabling the first knob 52 to be rotated by an external force relative to the base 30. A first stop member 524 radially and outwardly extends from the first shank 522. The first eccentric shaft 54 has one end axially and eccentrically connected to the first shank 522 of the first knob 52 so that the first eccentric shaft 54 is synchronously rotatable with the first knob 52. An opposite end of the first eccentric shaft 52 is engaged to the first elongated slot 418 of the retaining seat 41.

The second adjustment unit 60 comprises a second knob 62 and a second eccentric shaft 64, as shown in FIGS. 1, 3 and 4. The second knob 62 is exposed to the outside of the shell 80. The second knob 62 comprises a second shank 622 which is disposed in a perpendicular manner relative to the first shank 522 of the first knob 52 and is coupled to the second axle hole 416 for enabling the second knob 62 to be rotated by an external force relative to the retaining seat 41. A second stop member 624 radially and outwardly extends from the second shank 622. The second eccentric shaft 64 has one end axially and eccentrically connected to the second shank 622 of the second knob 62 so that the second eccentric shaft 64 is synchronously rotatable with the second knob 62. An opposite end of the second eccentric shaft 64 is coupled to the second elongated slot 428 of the extension arm 426 of the auxiliary seat 42.

Figure 6:
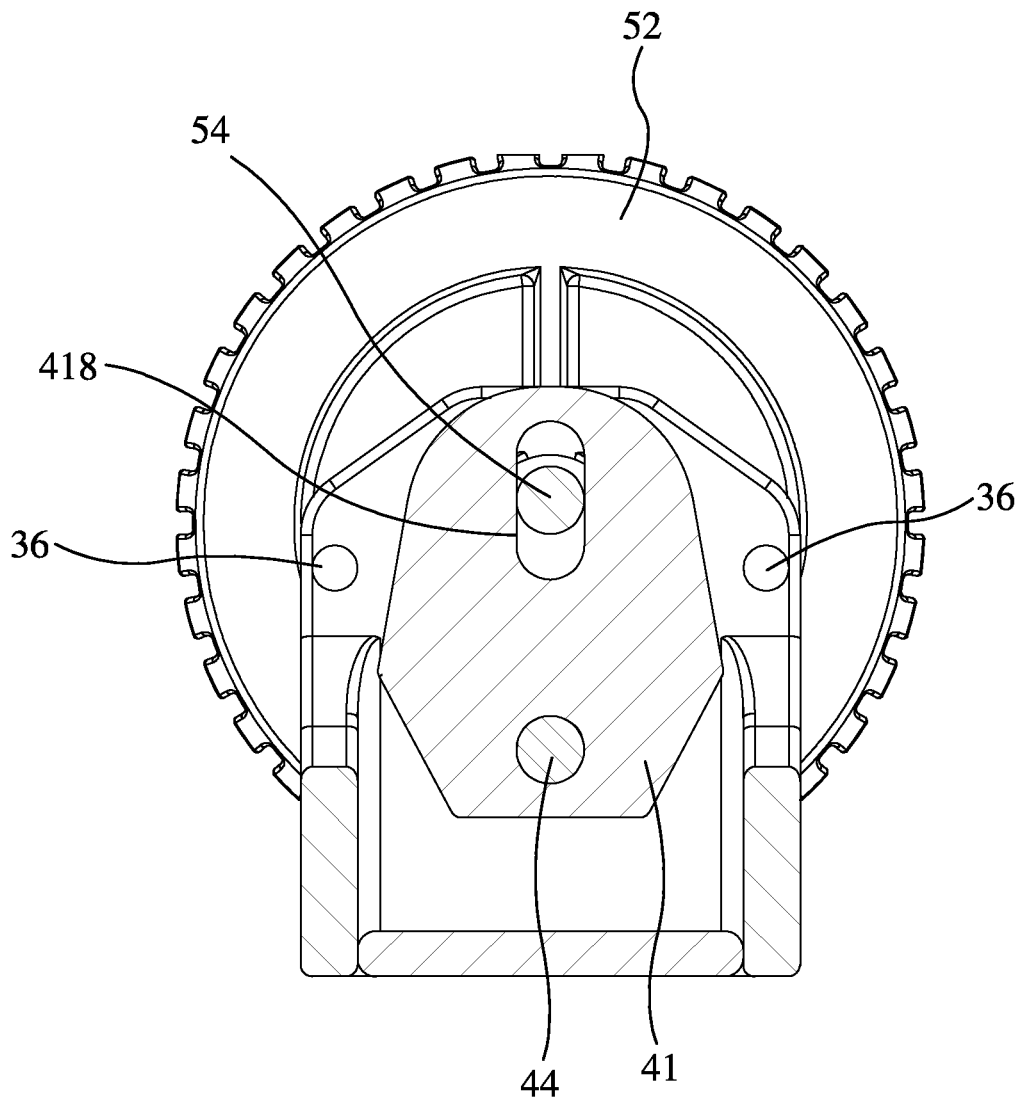
FIG. 6 is a sectional view of a part of the laser alignment device in accordance with the present invention, illustrating the status of a first knob before rotation.
Figure 7:
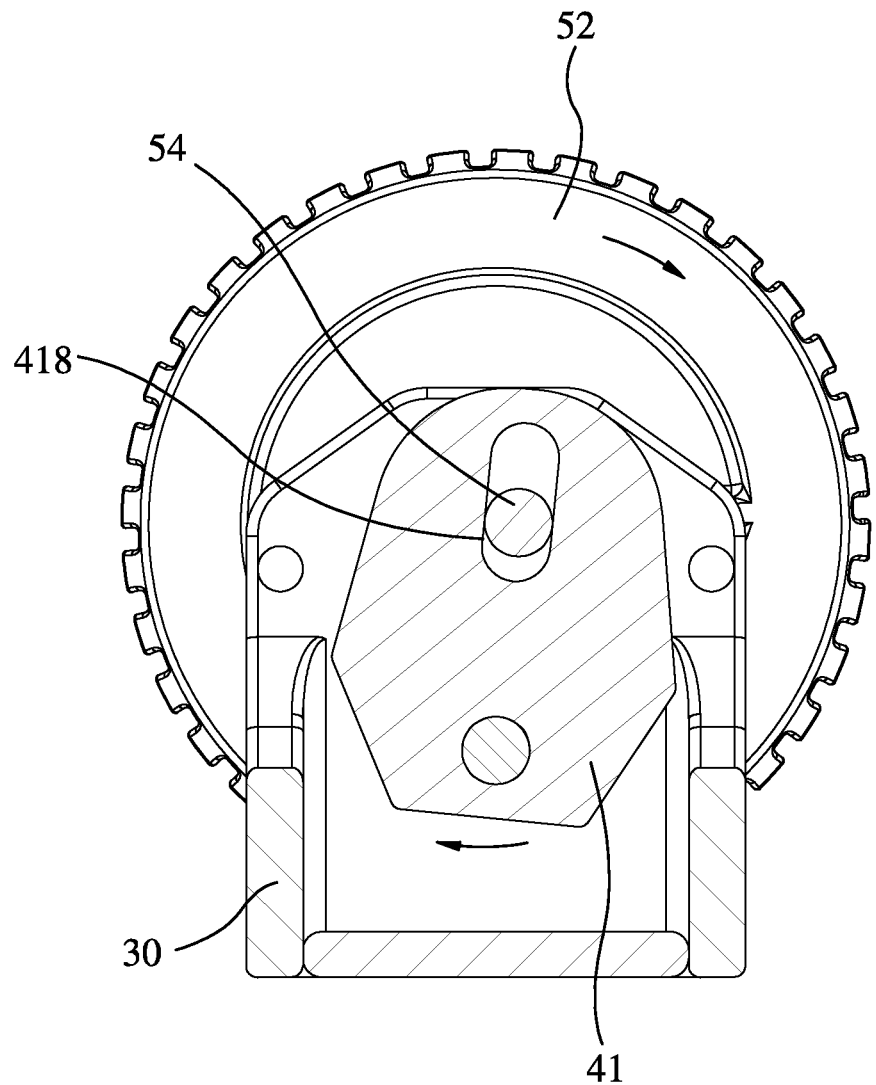
FIG. 7 is another view similar to FIG. 6, illustrating the first knob being rotated.
Figure 8:
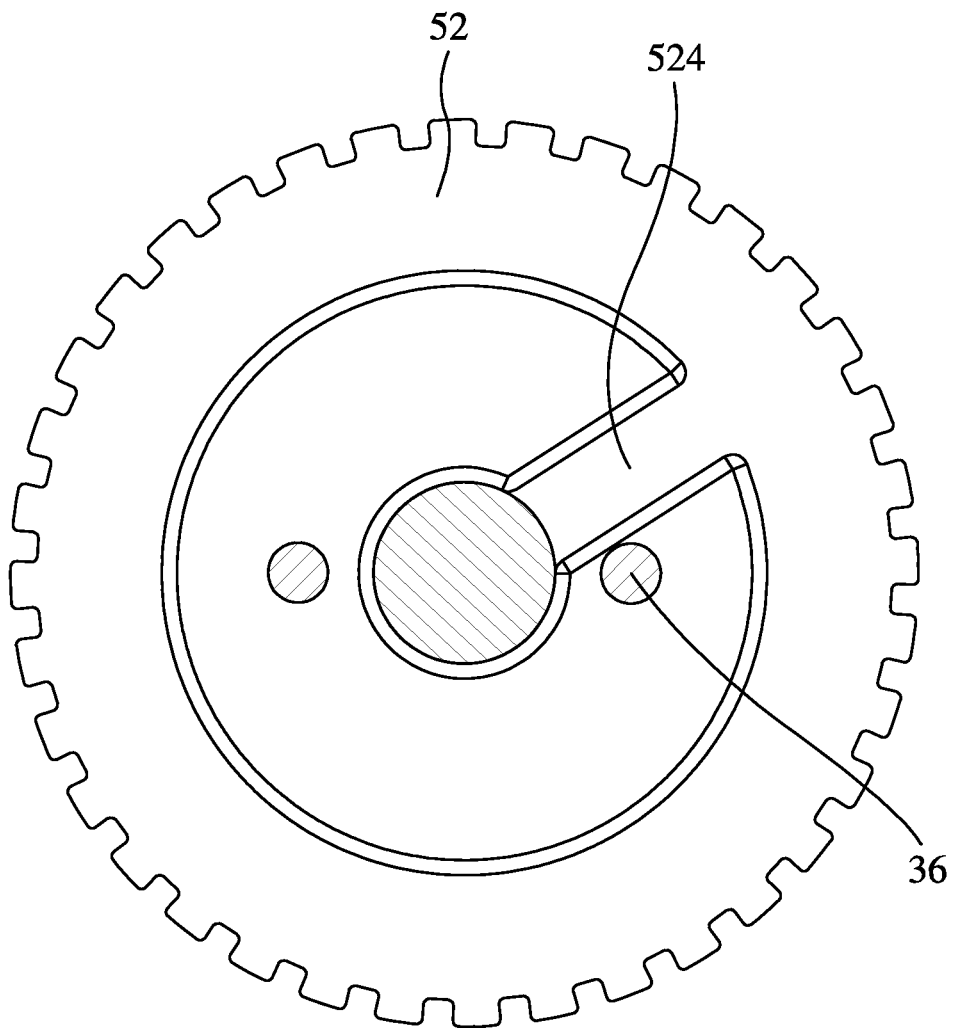
FIG. 8 is a sectional view of the first knob of the laser alignment device in accordance with the present invention, illustrating a first stop member of the first knob touching a first position-limit component.

Referring to FIGS. 6 and 7 and FIG. 4 again, when rotating the first knob 52, the first eccentric shaft 54 is rotatably driven to urge the first elongated slot 418 of the retaining seat 41 for pivoting the retaining seat 41 relative to the base 30 such that the laser beam generator 43 is simultaneously pivoted with the retaining seat 41 for allowing vertical angle adjustment of the generated light plane. In other words, by rotating the first knob 52, the generated light plane is moved in a side-to-side direction with respect to the saw blade 16. It should be noted that once the first stop member 524 of the first knob 52 reaches either one of the first position-limit components 36 during rotation of the first knob 52, as shown in FIG. 8, it means the first knob 52 has reached the maximum angle of rotation and cannot be rotated further in the same direction.

Figure 9:
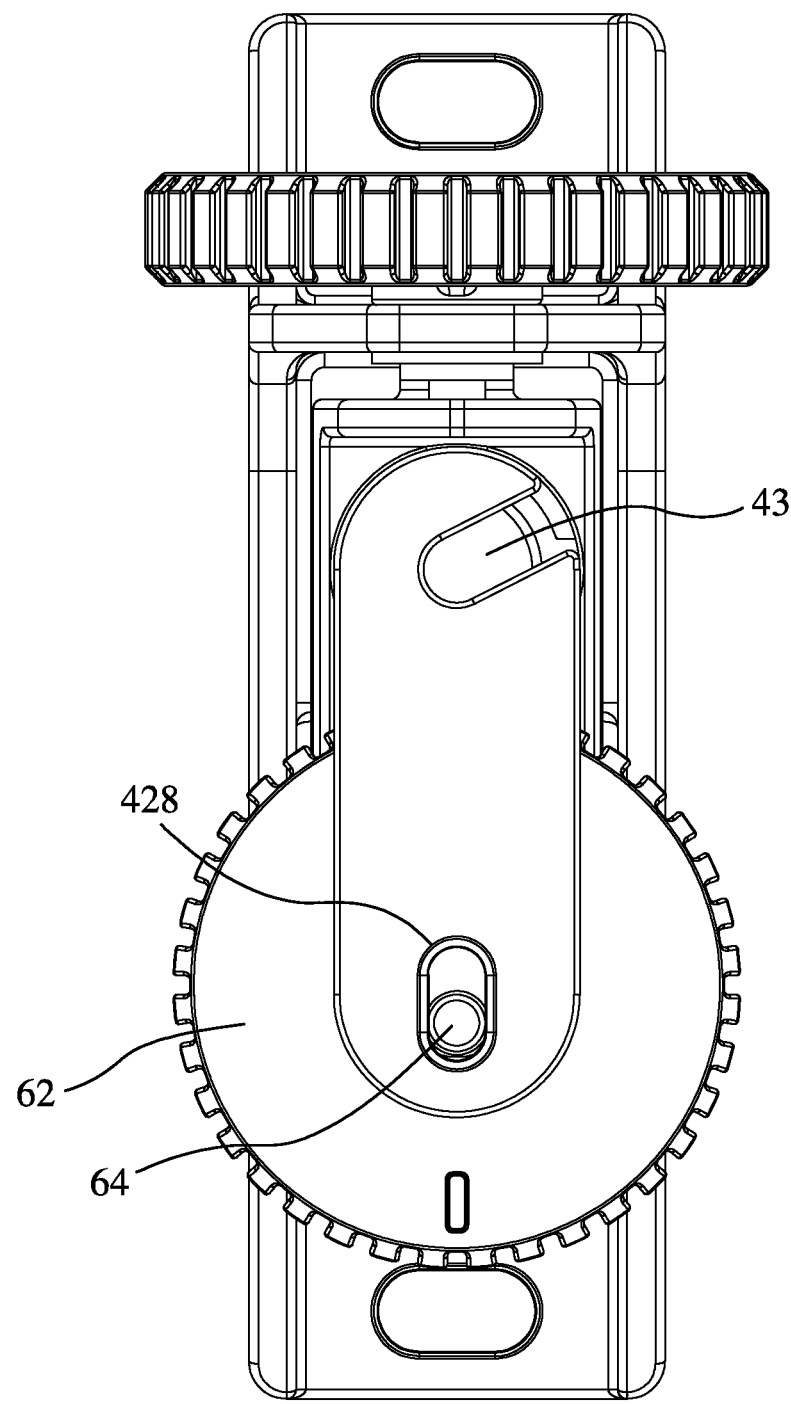
FIG. 9 is a top view of the present invention, illustrating the status of the second knob before rotation.
Figure 10:
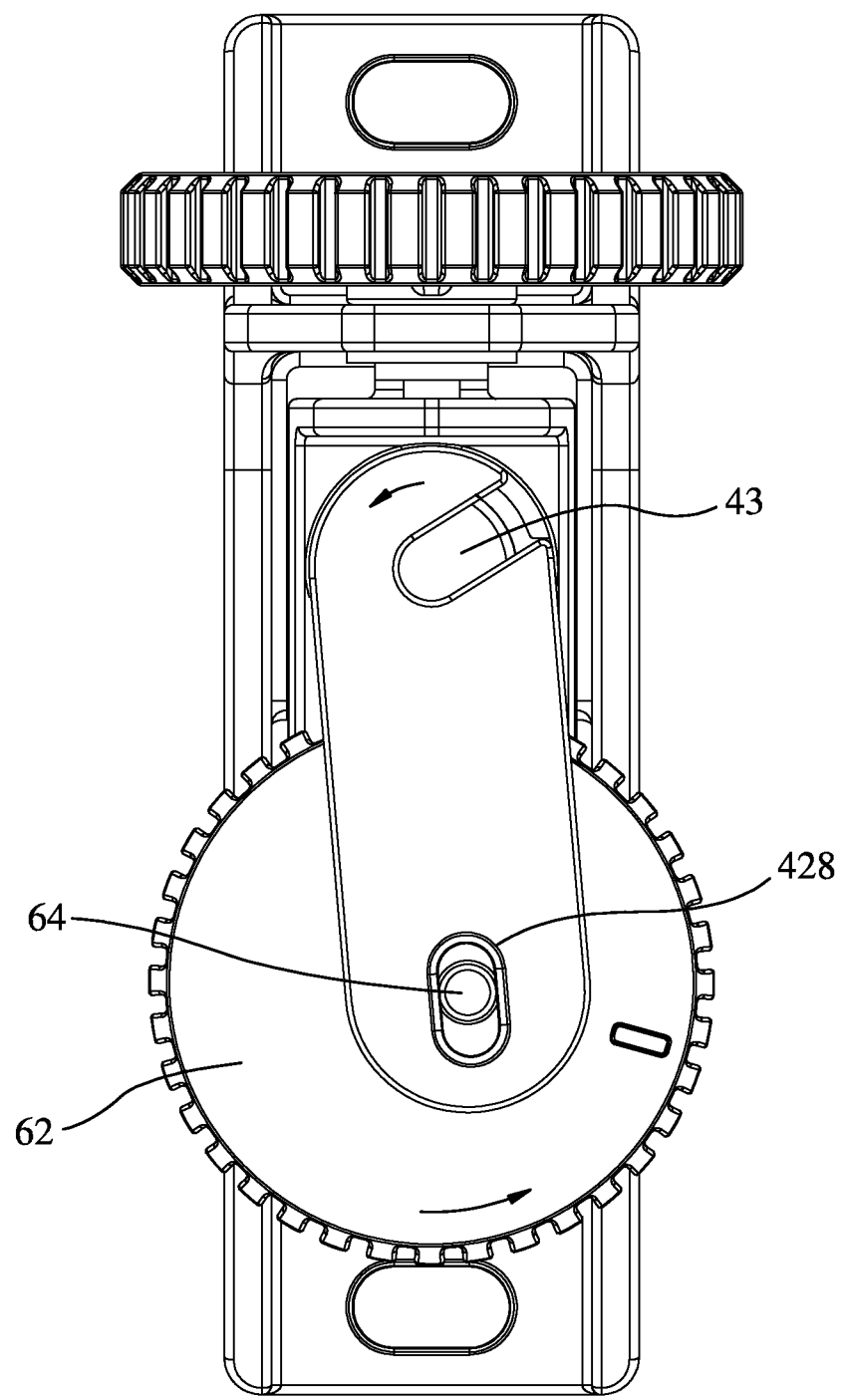
FIG. 10 is another view similar to FIG. 9, illustrating the second knob being rotated.
Figure 11:
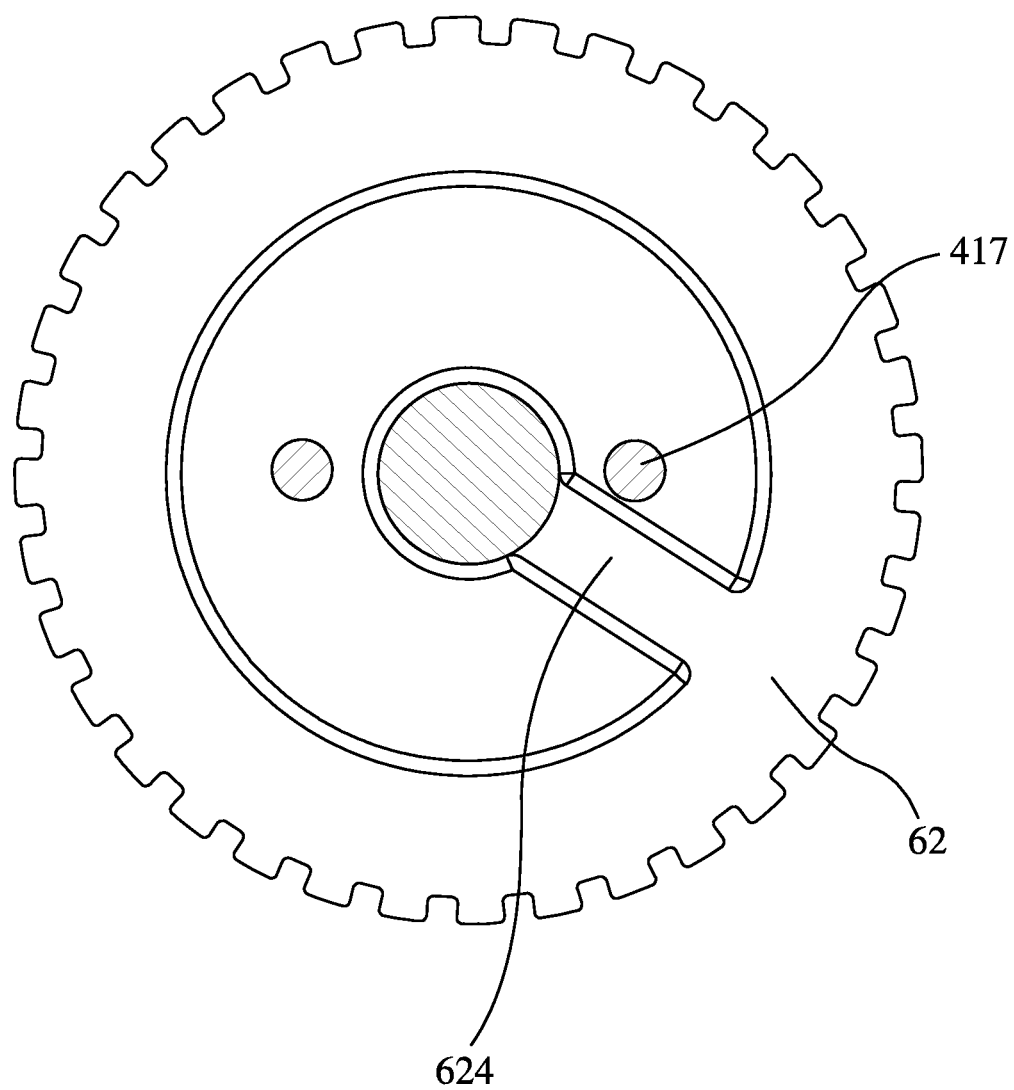
FIG. 11 is a sectional view of the second knob of the laser alignment device in accordance with the present invention, illustrating a second stop member of the second knob touching a second position-limit component.

Referring to FIGS. 9 and 10, as well as FIG. 3 again, when rotating the second knob 62, the second eccentric shaft 64 urges the second elongated slot 428 of the auxiliary seat 42 for pivotally rotating the barrel 422 of the auxiliary seat 42 in the mounting hole 413 relative to the retaining seat 41. Thereby, the laser beam generator 43 is simultaneously rotated with the auxiliary seat 42 for allowing horizontal angle adjustment of the generated light plane. In other words, by rotating the second knob 62, an orientation of the generated light plane is varied with respect to a plane of the saw blade 16, such that the parallel arrangement of the light plane with respect to the saw blade 16 can be adjusted. Similarly, when the second stop member 624 of the second knob 62 reaches either one of the second position-limit components 417, as shown in FIG. 11, it means the second knob 62 has reached the maximum angle of rotation.

It should further be appreciated that the base 30 may be directly affixed to the blade guard 18 by fastening two fastening members (not shown) to the respective mounting slots 38. Therefore, the light plane of the laser beam generator 43 is projected within a predetermined position which is located adjacent to the saw blade 16. Accordingly, the user does not need to adjust a distance between the projected light plane of the laser beam generator 43 with respect to the saw blade 16, and thus adjustments are efficiently simplified.

In conclusion, the laser alignment device 20 of the invention allows for adjustment of orientation of the laser beam generator 43 without the use of any tool. The user can quickly achieve adjustment simply by rotating the first knob 52 and the second knob 62. Therefore, the invention not only simplifies the adjustment process, but also enhances operating convenience.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser alignment device installed in a circular saw comprising a saw blade and a blade guard partially surrounding said saw blade, said laser alignment device comprising:
   a base adapted to be affixed to said blade guard;
   a laser module comprising a retaining seat pivotally mounted to said base, an auxiliary seat pivotally mounted to said retaining seat, and a laser beam generator disposed in said auxiliary seat; said retaining seat having a first elongated slot defined therein, and said auxiliary seat having a second elongated slot defined therein;
   a first adjustment unit comprising a first knob and a first eccentric shaft, said first knob being rotatably mounted to said base, wherein said first eccentric shaft includes one end thereof eccentrically and fixedly connected to said first knob, and an opposite end thereof coupled to said first elongated slot of said retaining seat; and
   a second adjustment unit comprising a second knob and a second eccentric shaft, said second knob being rotatably mounted to said retaining seat, wherein said second eccentric shaft includes one end thereof eccentrically and fixedly connected to said second knob, and an opposite end thereof coupled to said second elongated slot of said auxiliary seat.

2. The laser alignment device as claimed in claim 1, wherein said retaining seat comprises an end wall having said first elongated slot located therein.

3. The laser alignment device as claimed in claim 1, wherein said retaining seat comprises a mounting hole, and wherein said auxiliary seat includes a barrel accommodated in said mounting hole for holding said laser beam generator, and an extension arm radially extending from said barrel and having said second elongated slot located in said extension arm.

4. The laser alignment device as claimed in claim 3, wherein said mounting hole has at least one first protruding block formed in an inner periphery thereof, and a gap located adjacent to said at least one first protruding block.

5. The laser alignment device as claimed in claim 4, wherein said barrel of said auxiliary seat comprises a second protruding block corresponding to said gap;
   wherein, the barrel is inserted into the mounting hole with the two second protruding blocks correspondingly guided through the gaps of the mounting hole when mounting said auxiliary seat to the mounting hole, such that the barrel is inserted and accommodated in the mounting hole; and wherein the auxiliary seat is rotated relative to the mounting hole upon insertion such that the second protruding blocks engage with the first protruding blocks for rotatably securing the barrel to the mounting hole.

6. The laser alignment device as claimed in claim 1, wherein said first knob comprises a first shank fixedly connected with said first eccentric shaft; and wherein said second knob comprises a second shank fixedly connected with said second eccentric shaft, said second shank of said second knob being axially disposed in a perpendicular manner relative to said first shank of said first knob.

7. The laser alignment device as claimed in claim 6, wherein said first knob comprises a first stop member radially and outwardly extending from said first shank; and wherein said base comprises two first position-limit components spaced apart from each other at a predetermined distance and corresponding to said first stop member for limiting an angle of rotation of said first knob.

8. The laser alignment device as claimed in claim 6, wherein said second knob comprises a second stop member radially and outwardly extending from said second shank; and wherein said retaining seat comprises two second position-limit components spaced apart from each other at a predetermined distance and corresponding to said second stop member for limiting an angle of rotation of said second knob.

9. The laser alignment device as claimed in claim 1, further comprising a shell mounted around said base and adapted to be affixed to said blade guard of said circular saw.

* * * * *